(12) United States Patent
Pisacreta

(10) Patent No.: US 10,934,937 B2
(45) Date of Patent: Mar. 2, 2021

(54) METHOD AND APPARATUS FOR VARIABLE SUPPLEMENTAL AIRFLOW TO COOL AIRCRAFT COMPONENTS

(71) Applicant: UNITED TECHNOLOGIES CORPORATION, Farmington, CT (US)

(72) Inventor: Pellegrino J. Pisacreta, Newtown, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1064 days.

(21) Appl. No.: 15/213,491

(22) Filed: Jul. 19, 2016

(65) Prior Publication Data

US 2018/0022466 A1    Jan. 25, 2018

(51) Int. Cl.
| | |
|---|---|
| *F02K 1/38* | (2006.01) |
| *F02C 7/141* | (2006.01) |
| *B64D 33/08* | (2006.01) |
| *F02C 7/18* | (2006.01) |
| *F02K 1/82* | (2006.01) |
| *F02K 1/46* | (2006.01) |

(52) U.S. Cl.
CPC .............. *F02C 7/141* (2013.01); *B64D 33/08* (2013.01); *F02C 7/18* (2013.01); *F02K 1/38* (2013.01); *F02K 1/383* (2013.01); *F02K 1/825* (2013.01); *F02K 1/46* (2013.01); *F02K 1/822* (2013.01); *Y02T 50/675* (2013.01)

(58) Field of Classification Search
CPC ... F02K 1/38; F02K 1/383; F02K 1/46; F02K 1/822
See application file for complete search history.

(56) References Cited

U.S. PATENT DOCUMENTS

| | | | | |
|---|---|---|---|---|
| 2,986,002 | A | * | 5/1961 | Ferri ..................... F02K 1/1207 181/213 |
| 3,921,906 | A | | 11/1975 | Nye et al. |
| 4,002,024 | A | | 1/1977 | Nye et al. |
| 4,732,538 | A | | 3/1988 | Wollenweber et al. |
| 5,157,917 | A | | 10/1992 | Liang et al. |
| 5,269,139 | A | * | 12/1993 | Klees ..................... F02K 1/383 60/262 |
| 5,284,012 | A | | 2/1994 | Laborie et al. |
| 5,682,739 | A | | 11/1997 | Weinstein et al. |

(Continued)

FOREIGN PATENT DOCUMENTS

GB    2001136 A  *  1/1979  ............... F02K 1/46

*Primary Examiner* — Ehud Gartenberg
*Assistant Examiner* — Thomas P Burke
(74) *Attorney, Agent, or Firm* — Carlson, Gaskey & Olds, P.C.

(57) ABSTRACT

A cooling system for an aircraft has at least one moveable member configured to cover an opening formed within an aircraft outer skin. An actuator moves the at least one moveable member between a fully open position where external atmosphere air can be directed through the opening to an internal passage enclosed by the aircraft outer skin and a fully closed position where the opening is covered. A controller selectively controls the actuator to move the at least one moveable member between the fully open and fully closed positions. An aircraft engine and a method of cooling an aircraft engine in an aircraft are also disclosed.

6 Claims, 3 Drawing Sheets

(56) References Cited

U.S. PATENT DOCUMENTS

| | | | | |
|---|---|---|---|---|
| 5,761,899 | A * | 6/1998 | Klees | F02C 7/042 |
| | | | | 239/265.13 |
| 5,826,794 | A * | 10/1998 | Rudolph | F02K 1/383 |
| | | | | 239/265.17 |
| 5,908,159 | A * | 6/1999 | Rudolph | F02K 1/383 |
| | | | | 239/265.17 |
| 6,102,329 | A | 8/2000 | Guinan et al. | |
| 6,253,540 | B1 | 7/2001 | Chew et al. | |
| 7,827,801 | B2 | 11/2010 | Dawson et al. | |
| 8,051,662 | B2 | 11/2011 | Figueroa et al. | |
| 9,108,737 | B2 | 8/2015 | Zysman | |
| 9,127,551 | B2 | 9/2015 | Narcus et al. | |
| 9,194,330 | B2 * | 11/2015 | Wood | F02K 3/075 |
| 2005/0268595 | A1 | 12/2005 | Steyer | |
| 2007/0163230 | A1 * | 7/2007 | Dussillols | F02K 1/36 |
| | | | | 60/262 |
| 2013/0239542 | A1 | 9/2013 | Dasgupta | |
| 2014/0238043 | A1 * | 8/2014 | Sokhey | F02K 1/36 |
| | | | | 60/805 |
| 2014/0248119 | A1 | 9/2014 | Jen | |
| 2015/0260101 | A1 | 9/2015 | Reia Dos Santos Medes Gomes | |
| 2015/0369065 | A1 | 12/2015 | Feiereisen | |
| 2016/0097286 | A1 | 4/2016 | Tibbott | |

\* cited by examiner

METHOD AND APPARATUS FOR VARIABLE SUPPLEMENTAL AIRFLOW TO COOL AIRCRAFT COMPONENTS

BACKGROUND OF THE INVENTION

Aircraft engines discharge hot engine exhaust which has a strong infrared radiation (IR) signal. Further, the aircraft includes hot metal components that also emit a strong infrared radiation signal. These hot metal parts are normally associated with either the gas turbine or jet engine exhaust system. It is important to provide cooling for the components as needed, and to cool exhaust gases in order to reduce the infrared radiation signal as much as possible.

SUMMARY OF THE INVENTION

In a featured embodiment, a cooling system for an aircraft has at least one moveable member configured to cover an opening formed within an aircraft outer skin. An actuator moves the at least one moveable member between a fully open position where external atmosphere air can be directed through the opening to an internal passage enclosed by the aircraft outer skin and a fully closed position where the opening is covered. A controller selectively controls the actuator to move the at least one moveable member between the fully open and fully closed positions.

In another embodiment according to the previous embodiment, the controller is configured to control the actuator to hold the at least one moveable member between a plurality of different positions between the fully open and fully closed positions to vary an amount of external atmosphere air to be directed internally of the aircraft outer skin.

In another embodiment according to any of the previous embodiments, the moveable member is flush with an external surface of the aircraft outer skin when the moveable member is in the fully closed position.

In another embodiment according to any of the previous embodiments, the at least one moveable member comprises at least one of a scoop, door, flap, or panel that is moveable to direct external atmosphere air through the internal passage and to a desired cooling location within an aircraft engine.

In another embodiment according to any of the previous embodiments, the at least one moveable member comprises a plurality of moveable members that are positioned on the aircraft outer skin in one or more of a plurality of different locations dependent on where cooling flow is to be directed within an aircraft engine.

In another embodiment according to any of the previous embodiments, the internal passage comprises an aircraft engine interface duct, and wherein the desired cooling location within the aircraft engine comprises a predetermined area within an engine casing or an engine component enclosed within the engine casing.

In another embodiment according to any of the previous embodiments, the engine casing includes an opening in fluid communication with an outlet of the aircraft engine interface duct, and including at least one of a check valve or pump associated with the opening to direct cooling airflow to the predetermined area or engine component.

In another embodiment according to any of the previous embodiments, an aircraft engine enclosed by the aircraft outer skin and which includes an internal engine duct that directs airflow through the aircraft engine, and wherein the external atmosphere air is directed into the internal engine duct to mix with the airflow.

In another embodiment according to any of the previous embodiments, an aircraft engine enclosed by the aircraft outer skin and wherein the aircraft engine includes a cooling duct or ring dedicated to receiving the external atmosphere air, and wherein the cooling duct provides cooling airflow to cool engine exhaust gases that are added to exhaust gases flowing through existing internal engine ducts.

In another featured embodiment, an aircraft engine has an engine outer casing defining an internal cavity. A compressor section is positioned within the internal cavity. A combustor section is positioned within the internal cavity downstream of the compressor section. A turbine section is positioned within the internal cavity downstream of the combustor section, wherein the compressor section drives air along a core flow path for compression and communication into the combustor section and for expansion through the turbine section. At least one casing opening is formed within an outer surface of the engine outer casing. An aircraft engine interface duct is in fluid communication with the casing opening. A cooling circuit directs external atmosphere air into the aircraft engine interface duct, wherein the cooling circuit includes at least one moveable member configured to cover an external opening configured to be formed within an aircraft outer skin, an actuator to move the at least one moveable member between a fully open position where external atmosphere air can be directed through the external opening and into the aircraft engine interface duct and a fully closed position where the external opening is covered, and a controller that selectively controls the actuator to move the at least one moveable member between the fully open and fully closed positions.

In another embodiment according to the previous embodiment, the at least one moveable member comprises at least one of a scoop, door, flap, or panel.

In another embodiment according to any of the previous embodiments, the at least one moveable member comprises a plurality of moveable members that direct external atmosphere air into one or more aircraft engine interface ducts.

In another embodiment according to any of the previous embodiments, the controller and actuator are configured to position the at least one moveable member in an infinite number of positions between the fully open position and the fully closed position.

In another embodiment according to any of the previous embodiments, at least one of a check valve or pump associated with the casing opening to direct cooling airflow into the internal cavity.

In another embodiment according to any of the previous embodiments, the external atmosphere air flowing into the casing opening is mixed into the core flow path.

In another embodiment according to any of the previous embodiments, the external atmosphere air flowing into the casing opening is directed to cool engine exhaust gases exiting the engine casing to reduce the infrared radiation signal.

In another featured embodiment, a method of cooling an aircraft engine in an aircraft comprising the steps of a) providing at least one moveable member configured to cover an external opening formed within an aircraft outer skin; b) coupling an actuator to the at least one moveable member to move the moveable member between a fully open position where external atmosphere air can be directed through the external opening to an internal passage enclosed by the aircraft outer skin and a fully closed position where the external opening is covered; c) selectively controlling the actuator to move the at least one moveable member between the fully open and fully closed positions; and d) directing the external atmosphere air to a desired location within the aircraft engine.

In another embodiment according to any of the previous embodiments, directing the external atmosphere air to a desired location within the aircraft engine further includes directing the external atmosphere air to cool engine exhaust gases exiting the engine casing to reduce an infrared radiation signal.

In another embodiment according to any of the previous embodiments, directing the external atmosphere air to a desired location within the aircraft engine further includes directing the external atmosphere air into an existing engine cooling duct or ring to mix with core air flow through the aircraft engine.

In another embodiment according to any of the previous embodiments, directing the external atmosphere air to a desired location within the aircraft engine further includes directing the external atmosphere air into a dedicated cooling system duct or ring to be directed to a desired location within the aircraft.

The foregoing features and elements may be combined in any combination without exclusivity, unless expressly indicated otherwise.

These and other features may be best understood from the following drawings and specification.

DETAILED DESCRIPTION

Figure 1:
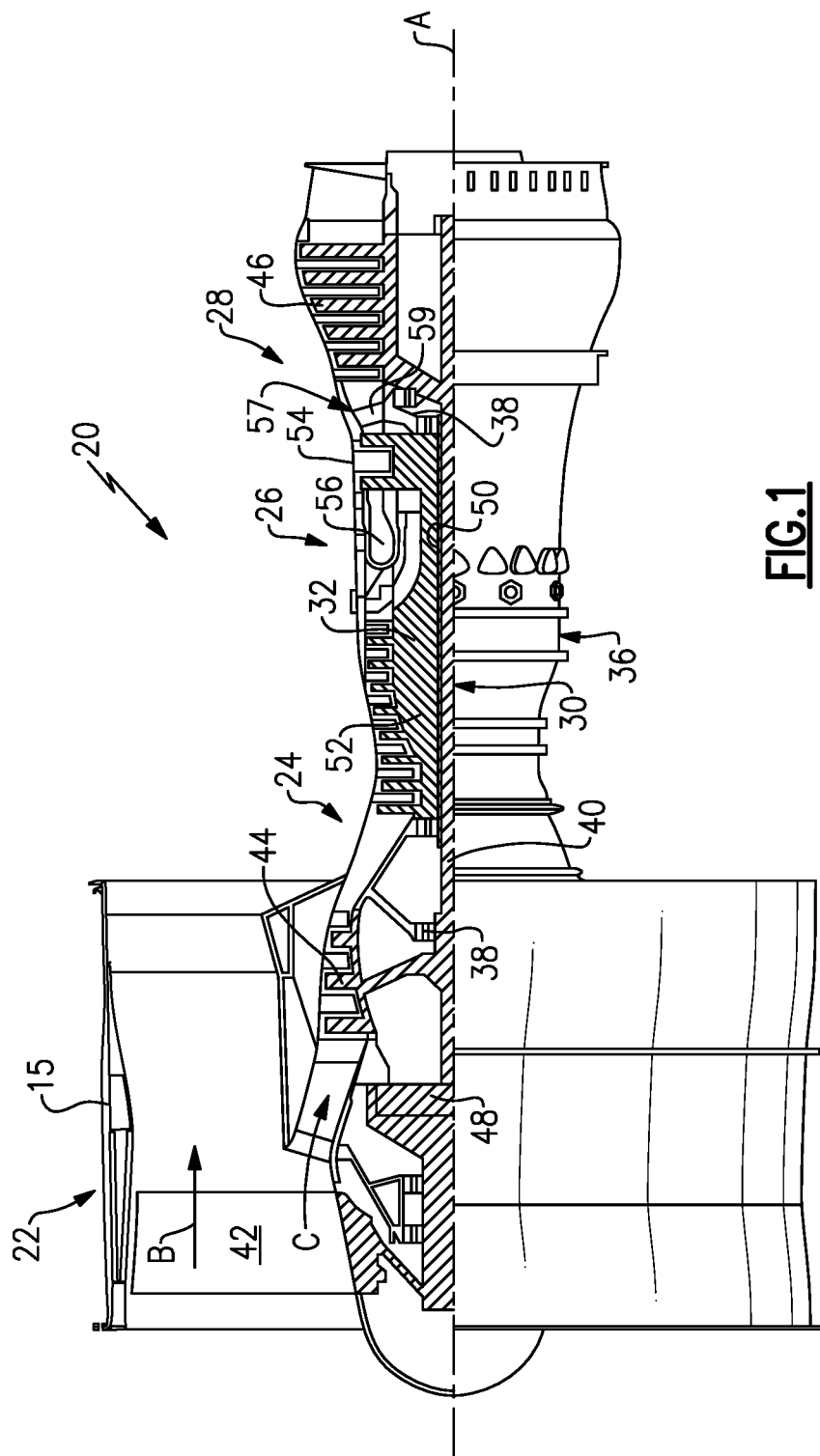
FIG. 1 is a schematic representation of one example of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram}° \text{ R})/(518.7° \text{ R})]^{0.5}$. The "Low corrected fan tip speed" as disclosed herein according to one non-limiting embodiment is less than about 1150 ft/second.

Figure 2A:
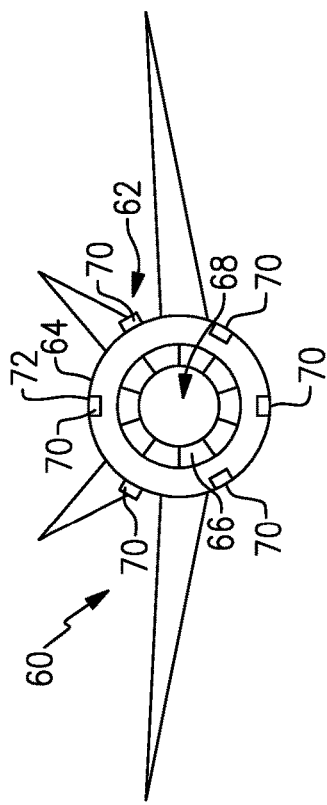
FIG. 2A is a schematic representation of an aft end of an aircraft incorporating the subject invention.
Figure 2B:
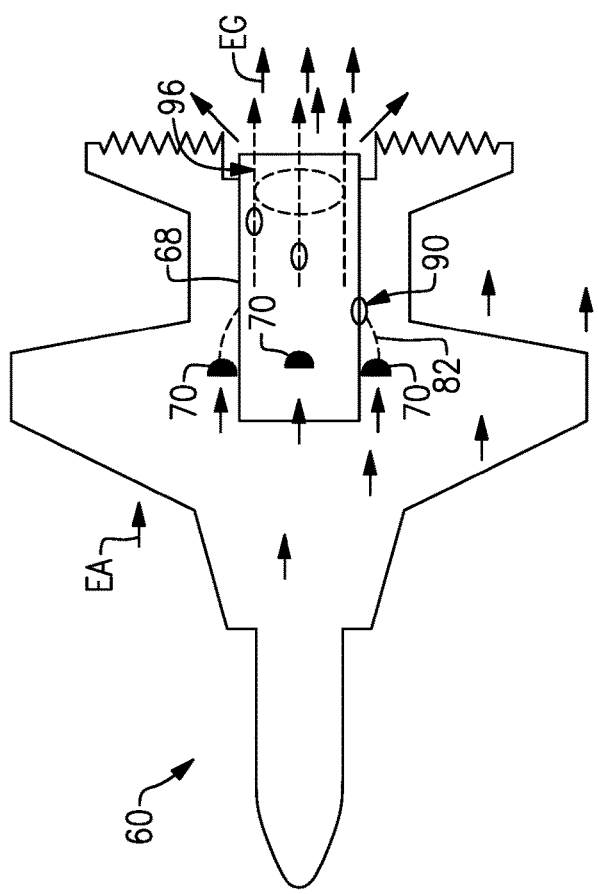
FIG. 2B is a schematic representation of a top view of the aircraft of FIG. 2A.
Figure 2C:
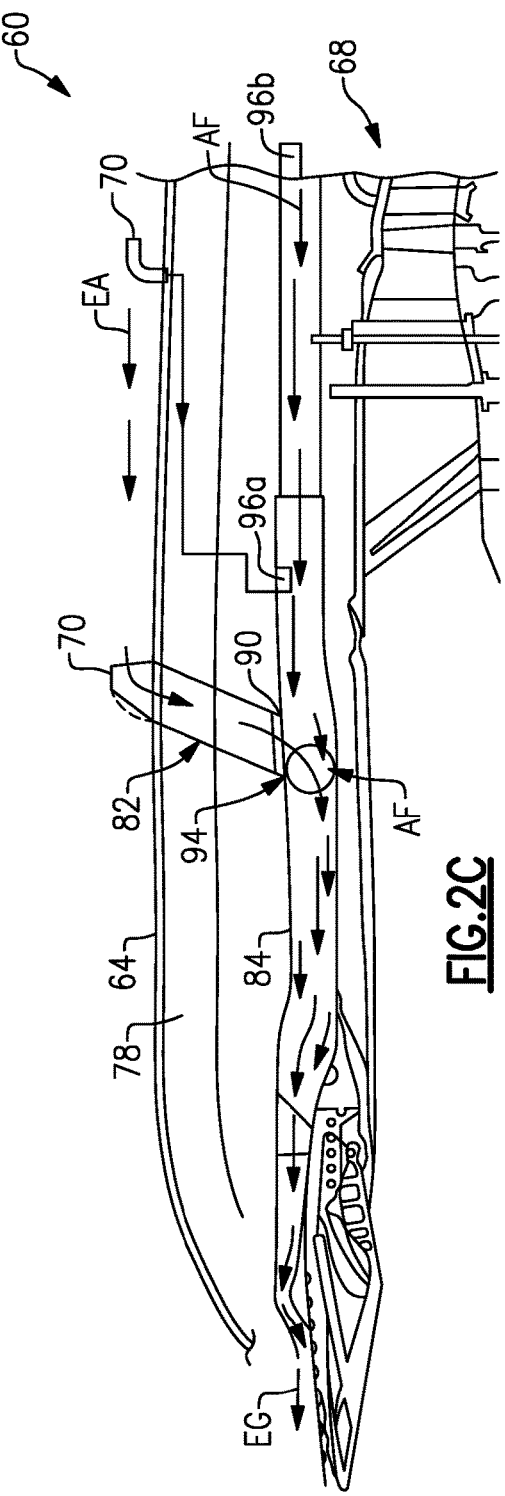
FIG. 2C is a schematic representation of a side section view of the aircraft of Figure A.

FIGS. 2A-2C show an aircraft 60 with a cooling circuit 62 that provides variable supplemental airflow that can be obtained during aircraft flight. The aircraft 60 can be a commercial or military aircraft, for example. The aircraft 60 includes an airframe structure 63 (FIG. 3) and an aircraft outer skin 64 that forms the external surface of the aircraft 60. As shown in FIG. 2A, the aircraft 60 includes a tail cone 66 from which hot exhaust gases exit an aircraft engine 68. In one example, the engine 68 comprises a gas turbine engine 20 (FIG. 1); however, it should be understood that the engine 68 could comprises any type of aircraft engine.

The cooling system 62 for the aircraft 60 comprises one or more moveable members 70 configured to cover one or more associated openings 72 formed within the aircraft outer skin 64. The moveable members 70 can comprise scoops (FIGS. 2A-2C), doors, panels or flaps (FIG. 3), or any other structure that can be moved to cover and uncover an associated opening 72 in the outer skin 64.

An actuator 74 is used to move the moveable members 70 between a fully open position where external atmosphere air EA can be directed through the openings 72 to an internal passage 76 (schematically shown in FIG. 3) enclosed by the aircraft outer skin 64 and airframe structure 63, and a fully closed position where the openings 72 are covered and the moveable members 70 are flush with the outer skin 64. Each moveable member 70 could have a dedicated actuator 74, or one actuator 74 could be used to move a plurality of moveable members 70. Further, any type of actuator could be used to move the moveable members. Some examples include solenoids, motors, linkages, cylinders, etc.

The moveable members 70 and/or actuators 74 can be mounted to an aircraft frame structure 78. The moveable members 70 route the cooler external atmosphere air EA through the frame structure 78 to desired locations within the aircraft. The shape, size, location, and number of moveable members 70 can vary dependent upon the aircraft application and/or desired cooling performance conditions.

A controller 80 selectively controls the actuator 74 to move the moveable members 70 between the fully open and fully closed positions. In one example, the controller 80 comprises a dedicated electronic control unit (ECU) programmed to control movement of the actuators 74 based on desired cooling performance. Optionally, the controller 80 can comprises a main aircraft control unit or any control sub-unit within the aircraft. These control units would be programmed accordingly to control movement of the actuators 74 based on desired cooling performance. This will be discussed in greater detail below.

The controller 80 is configured to control the actuator 74 to hold the moveable member between a plurality of different positions (see, e.g., dashed lines in FIG. 3) between the fully open and fully closed positions dependent upon a desired amount of external atmosphere air EA to be directed internally of the aircraft outer skin 64. Thus, the controller 80 and actuator 74 are configured to position the moveable members 70 in an infinite number of positions between the fully open position and the fully closed position.

Figure 3:
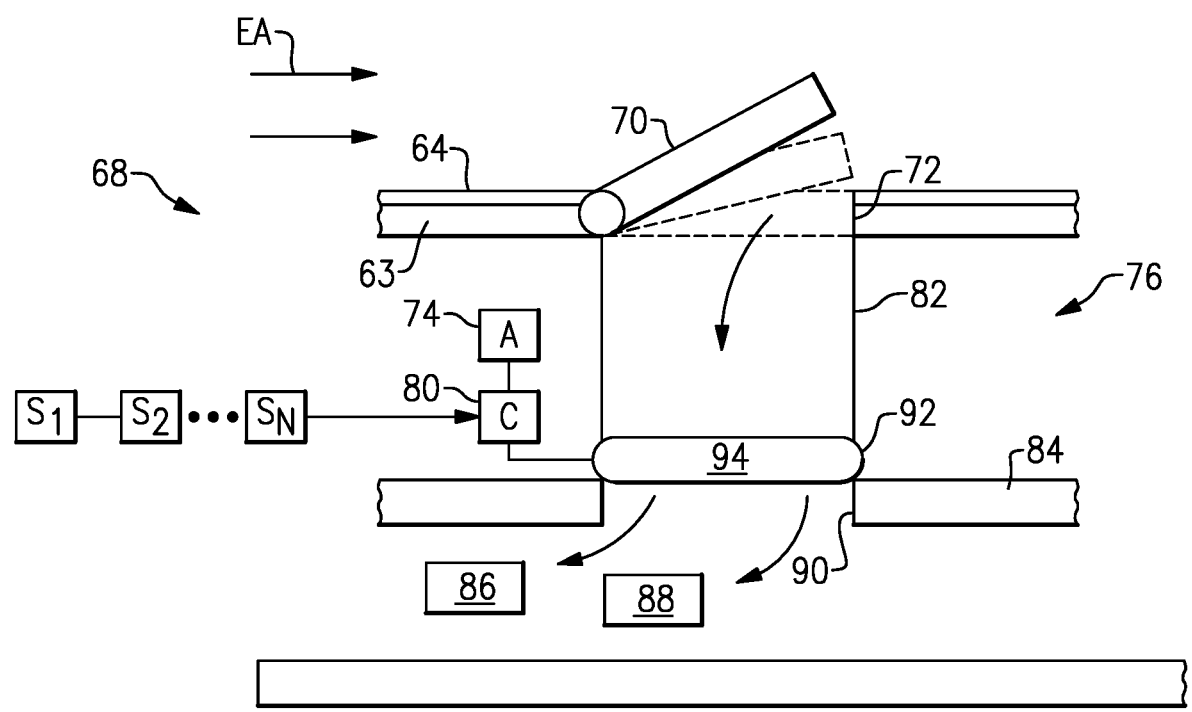
FIG. 3 is a schematic representation of control and moveable member as used in the aircraft of FIGS. 2A-2C.

As shown in FIGS. 2A and 3, the moveable members 70 are flush with the external surface of the aircraft outer skin 64 when the moveable members 70 are in the fully closed position. When flush with the external surface, the moveable members 70 will not impact the aircraft signature. When in the fully open position, or when in a position between fully open and fully closed, the moveable member 70 extends outwardly of the outer skin 64 to scoop or direct a portion of cooling external atmosphere air EA into the internal passage 76.

In one example, this air is then directed into a desired cooling location within the aircraft engine 68. The moveable members 70 are positioned on the aircraft outer skin 64 in one or more of many different possible locations dependent on where cooling flow will be needed within the aircraft engine 68. In one example, the internal passage 76 comprises an aircraft engine interface duct 82 that connects the openings 72 to an engine outer case 84 (FIGS. 2B, 2C, 3). Each opening 72 could be associated with one duct, or multiple openings 72 could be associated with a duct. Further, the duct 82 could be associated with, or part of, an existing duct already found on the aircraft 60, or could be a dedicated cooling duct installed for the cooling circuit 62. Once the external atmosphere air EA exits the duct 82, the air is directed to a desired cooling location within the aircraft engine 68, such as a predetermined area 86 within the engine casing 84 or directly to an engine component 88 enclosed within the engine casing 84.

In one example, the engine casing 84 includes an engine case access port or opening 90 in fluid communication with an outlet 92 of the aircraft engine interface duct 82. The cooling circuit 62 may include at least one of a check valve, pump, or any other device 94 that would aid in meeting flow and temperature requirements associated with the opening 90 to further control cooling airflow to the predetermined area 86 or engine component 88. The check valve or pump 94 could be passively controlled via pressure differentials for example, or could be actively controlled via the controller 80.

In another example, the aircraft engine 68 includes an internal engine duct or cooling ring 96 that directs airflow AF through the aircraft engine 68. The external atmosphere air EA is directed into the internal engine duct or cooling ring 96 to mix with the airflow AF. In one example, the internal engine duct or cooling ring 96 comprises an existing duct or ring 96a that is already provided within the engine 68. In another example, the duct 96 comprises a cooling duct or ring 96b that is dedicated to receiving the external atmosphere air EA that provides cooling airflow to cool engine exhaust gases that is added to exhaust gases flowing through existing internal engine ducts. In another example, the external atmosphere air EA flowing into the casing opening 90 is directed to cool engine exhaust gases EG exiting the engine casing via the tail cone 66 (FIG. 2A) to reduce the infrared radiation signal.

A method of cooling the aircraft engine 68 in the aircraft 60 is comprised of at least the following steps. One or more moveable members 70 are configured to cover external openings 72 formed within an aircraft outer skin 64 in any of the manners described above. One or more actuators 74 are coupled to the moveable members 70 to move the moveable member 70 between the fully open position where external atmosphere air EA can be directed through the external openings 72 to an internal passage 76 enclosed by the aircraft outer skin 64, and a fully closed position where the external openings 72 are covered. The controller 80 selectively controls the actuators 74 to move the moveable members 70 between the fully open and fully closed positions. Then the external atmosphere air EA is directed to a desired location within the aircraft engine 68.

Additional steps can include one or more of the following steps: directing the external atmosphere air to cool engine exhaust gases exiting the engine casing to reduce an infrared radiation signal; directing the external atmosphere air into an existing engine duct to mix with core air flow through the aircraft engine; and/or directing the external atmosphere air into a dedicated cooling system duct to be directed to a desired location within the aircraft 60.

The controller 80 selectively controls the actuators 74 to move the moveable members 70 between the fully open and fully closed positions dependent upon desired cooling performance. Various sensors (s1, s2, . . . sn) can be used to sense and monitor various aircraft and engine conditions and transmit this data to the controller 80. For example, temperature sensors, speed sensors, mass flow sensors, etc. can be used to identify areas or components within the aircraft that need additional cooling air in order to improve engine performance or to reduce the IR signal.

The subject invention uses a unique cooling circuit 62 to introduce cooler outside external atmospheric air into the aircraft for cooling purposes. The amount of air introduced is controlled to provide variable supplemental cooling airflow to desired locations during flight. The cooling circuit 62 can be added to the engine 68, or can be introduced into an already existing airflow system. The cooling circuit 62 provides a reduction in in aircraft IR signature by making the temperature of the existing engine airflow stream/exhaust cooler.

Additionally, this cooling air can be directed to targeted areas or components that are inside or on the engine. This will allow for reduction of low cycle fatigue (hot/cold cycling) and a reduction of high cycle fatigue (vibrations). Further, the life of internal components can be extended by routing cooling air to specific areas or components, such as actuator nozzles, for example.

Although embodiments of this invention has been disclosed, a worker of ordinary skill in this art would recognize that certain modifications would come within the scope of this invention. For that reason, the following claims should be studied to determine the true scope and content of this invention.

The invention claimed is:

1. An aircraft engine comprising:
   an engine outer casing defining an internal cavity;
   a compressor section positioned within the internal cavity;
   a combustor section positioned within the internal cavity downstream of the compressor section;
   a turbine section positioned within the internal cavity downstream of the combustor section, wherein the compressor section drives air along a core flow path for compression and communication into the combustor section and for expansion through the turbine section;
   at least one casing opening formed within an outer surface of the engine outer casing;
   an aircraft engine interface duct in fluid communication with the at least one casing opening; and
   a cooling circuit to direct external atmosphere air into the aircraft engine interface duct, wherein the cooling circuit includes at least one moveable member configured to cover an external opening configured to be formed within an aircraft outer skin, wherein the at least one moveable member comprises at least one of a scoop, door, flap, or panel,
   an actuator to move the at least one moveable member between a fully open position where external atmosphere air can be directed through the external opening and into the aircraft engine interface duct and a fully closed position where the external opening is covered, and
   a controller that selectively controls the actuator to move the at least one moveable member between the fully open position and the fully closed position, and wherein the controller opens the at least one moveable member to direct external atmosphere air through the aircraft engine interface duct and to a desired cooling location within the aircraft engine.

2. An aircraft engine comprising:
   an engine outer casing defining an internal cavity;
   a compressor section positioned within the internal cavity;
   a combustor section positioned within the internal cavity downstream of the compressor section;
   a turbine section positioned within the internal cavity downstream of the combustor section, wherein the compressor section drives air along a core flow path for compression and communication into the combustor section and for expansion through the turbine section;
   at least one casing opening formed within an outer surface of the engine outer casing;
   an aircraft engine interface duct in fluid communication with the at least one casing opening; and
   a cooling circuit to direct external atmosphere air into the aircraft engine interface duct, wherein the cooling circuit includes at least one moveable member configured to cover an external opening configured to be formed within an aircraft outer skin, wherein the at least one moveable member comprises a plurality of moveable members that are axially spaced apart from each other along a length of an aircraft and that direct external atmosphere air into one or more aircraft engine interface ducts,
   an actuator to move the at least one moveable member between a fully open position where external atmosphere air can be directed through the external opening and into the aircraft engine interface duct and a fully closed position where the external opening is covered, and
   a controller that selectively controls the actuator to move the at least one moveable member between the fully open position and the fully closed position, and wherein the controller opens the at least one moveable member to direct external atmosphere air through the aircraft engine interface duct and to a desired cooing location within the aircraft engine.

3. An aircraft engine comprising:
   an engine outer casing defining an internal cavity;
   a compressor section positioned within the internal cavity;
   a combustor section positioned within the internal cavity downstream of the compressor section;
   a turbine section positioned within the internal cavity downstream of the combustor section, wherein the compressor section drives air along a core flow path for compression and communication into the combustor section and for expansion through the turbine section;
   at least one casino opening formed within an outer surface of the engine, outer casing;
   an aircraft engine interface duct in fluid communication with the at least one casing opening; and
   a cooling circuit to direct external atmosphere air into the aircraft engine interface duct, wherein the cooling circuit includes at least one moveable member configured to cover an external opening configured to be formed within an aircraft outer skin, an actuator to move the at least one moveable member between a fully open position where external atmosphere air can be directed through the external opening and into the aircraft engine interface duct and a fully closed position where the external opening is covered, and a controller that selectively controls the actuator to move the at least one moveable member between the fully open position and the fully closed position, and wherein the controller opens the at least one moveable member to direct external atmosphere air through the aircraft engine interface duct and to a desired cooling location within the aircraft engine, and wherein the controller and actuator are configured to position the at least one moveable member in a plurality of positions between the fully open and the fully closed positions.

4. An aircraft engine comprising:
an engine casing defining an internal cavity;
a compressor section positioned within the internal cavity;
a combustor section positioned within the internal cavity downstream of the compressor section;
a turbine section positioned within the internal cavity downstream of the combustor section, wherein the compressor section drives air along a core flow path for compression and communication into the combustor section and for expansion through the turbine section;
at least one casing opening formed within an outer surface of the engine outer casing;
an aircraft engine interface duct in fluid communication with the at least one casing opening; and
a cooling circuit to direct external atmosphere air into the aircraft engine interface duct, wherein the cooling circuit includes at least one moveable member configured to cover an external opening configured to be formed within an aircraft outer skin,
an actuator to move the at least one moveable member between a fully open position where external atmosphere air can be directed through the external opening and into the aircraft engine interface duct and a fully closed position where the external opening is covered, and
a controller that selectively controls the actuator to move the at least one moveable member between the fully open position and the fully closed position, and wherein the controller opens the at least one moveable member to direct external atmosphere air through the aircraft engine interface duct and to a desired cooling location within the aircraft engine, and wherein the external atmosphere air flowing into the at least one casing opening is mixed into the core flow path.

5. An aircraft engine comprising:
an engine casing defining an internal cavity;
a compressor section positioned within the internal cavity;
a combustor section positioned within the internal cavity downstream of the compressor section;
a turbine section positioned within the internal cavity downstream of the combustor section, wherein the compressor section drives air along a core flow path for compression and communication into the combustor section and or expansion through the turbine section;
at least one casing opening formed within an outer surface of the engine outer casing;
an aircraft engine interface duct in fluid communication with the at least one casino opening; and
a cooling circuit to direct external atmosphere air into the aircraft engine interface duct, wherein the cooling circuit includes at least one moveable member configured to cover an external opening configured to be formed within an aircraft outer skin,
an actuator to move the at least one moveable member between a fully open position where external atmosphere air can be directed through the external opening and into the aircraft engine interface duct and a fully closed position where the external opening is covered, and
a controller that selectively controls the actuator to move the at least one moveable member between the fully open position and the fully closed position, and wherein the controller opens the at least one moveable member to direct external atmosphere air through the aircraft engine interface duct and to a desired cooling location within the aircraft engine, and wherein the external atmosphere air flowing into the at least one casing opening is directed to cool engine exhaust gases exiting the engine outer casing to reduce an infrared radiation signal.

6. A method of cooling an aircraft engine in an aircraft comprising:
(a) providing at least one moveable member configured to cover an external opening formed within an aircraft outer skin;
(b) coupling an actuator to the at least one moveable member to move the at least one moveable member between a fully open position where external atmosphere air can be directed through the external opening to an internal passage enclosed by the aircraft outer skin and a fully closed position where the external opening is covered;
(c) selectively controlling the actuator to position the at least one moveable member in one of a plurality of positions between the fully open position and the fully closed position to vary an amount of external atmosphere air to be directed internally of the aircraft outer skin; and
(d) directing the external atmosphere air into a dedicated cooling system duct or ring to be directed to a desired location within the aircraft engine.

* * * * *